US012161598B1

(12) United States Patent
Wang

(10) Patent No.: US 12,161,598 B1
(45) Date of Patent: Dec. 10, 2024

(54) SEX TOY

(71) Applicants: Dongguan Mimao Electronic Technology Co., Ltd., Guangdong (CN); Shenzhen Zhonghongtian Technology Co., Ltd., Shenzhen (CN)

(72) Inventor: Qinling Wang, Guangdong (CN)

(73) Assignees: Dongguan Mimao Electronic Technology Co., Ltd., Dongguan (CN); Shenzhen Zhonghongtian Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/516,984

(22) Filed: Nov. 22, 2023

(51) Int. Cl.
*A61H 19/00* (2006.01)
*A61H 23/02* (2006.01)

(52) U.S. Cl.
CPC ..... *A61H 19/32* (2013.01); *A61H 2023/0272* (2013.01); *A61H 2201/5097* (2013.01)

(58) Field of Classification Search
CPC .......... A61H 7/00; A61H 7/001; A61H 7/002; A61H 7/003; A61H 7/004; A61H 7/005; A61H 23/00; A61H 23/006; A61H 23/02; A61H 23/0254; A61H 2023/0272; A61H 19/00; A61H 19/30; A61H 19/32; A61H 19/34; A61H 19/50
See application file for complete search history.

(56) References Cited

U.S. PATENT DOCUMENTS

| | | | | |
|---|---|---|---|---|
| 7,153,282 B1 * | 12/2006 | Dudley | .................. | A61H 7/004 601/93 |
| 9,138,373 B2 * | 9/2015 | Caropelo | ............... | A61H 19/30 |
| 11,369,545 B1 * | 6/2022 | He | .......................... | A61H 7/001 |
| 11,491,078 B1 * | 11/2022 | He | .......................... | A61H 7/005 |
| 11,554,073 B1 * | 1/2023 | Guo | ........................ | A61H 7/005 |
| 11,633,327 B1 * | 4/2023 | Wu | .................... | A61H 23/0263 601/70 |
| 11,806,306 B1 * | 11/2023 | Guo | ........................ | A61H 7/007 |
| 2019/0125624 A1 * | 5/2019 | DeVore | .................. | A61H 19/32 |
| 2021/0196556 A1 * | 7/2021 | Fuster | .................... | A61H 7/004 |

* cited by examiner

*Primary Examiner* — Colin W Stuart

(57) ABSTRACT

A sex toy includes a shell and first and second stimulation modules mounted in the shell. The shell includes at least two swinging portions. The first stimulation module includes at least two swinging bars being rotatably connected to the shell. Each of the at least two swinging bars includes a swinging end extending into one of the at least two swinging portions of the shell, and the swinging ends of the at least two swinging bars are swingable towards each other or away from each other. The second stimulation module includes a vibration member, and the vibration member is arranged in or between the at least two swinging portions.

20 Claims, 20 Drawing Sheets

SEX TOY

TECHNICAL FIELD

The present application relates to the technical field of adult products, and in particular to a sex toy.

BACKGROUND

In recent years, adult sex products are developed to help the users to release their sex pressure. Generally, an existing sex toy uses a vibration motor to provide vibration to the user's sensitive areas, such as the female genitalia, the male genitalia and the like, which has poor stimulation effects and is therefore difficult to meet users' needs.

SUMMARY

An object of the present application is to provide a sex toy which can provide better stimulation effects, thereby improving the sexual experience.

In order to achieve the above object, a technical solution of the present application provides a sex toy, including:

a shell including at least two swinging portions;

a first stimulation module mounted in the shell and including at least two swinging bars being rotatably connected to the shell, wherein each of the at least two swinging bars includes a swinging end extending into one of the at least two swinging portions of the shell, and the swinging ends of the at least two swinging bars are swingable towards each other or away from each other; and a second stimulation module mounted in the shell and including a vibration member, wherein the vibration member is arranged in or between the at least two swinging portions.

Compared with the prior art, the sex toy according to the embodiments of this application includes two different stimulation modules, one of which has swinging bars swinging towards or away from each other to occlude a part of the human body put therebetween, and the other generates vibration to the occluded part, thereby providing better stimulation effects to the user and accordingly improving the user's sexual experience.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

FIG. 0.8 is a further exploded view of a first stimulation module of the sex toy of FIG. 1.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIG. 1 to FIG. 6, a sex toy 100 according an embodiment of the present application is shown. The sex toy 100 includes a shell 20 and stimulation modules mounted in the shell 20.

Figure 1:
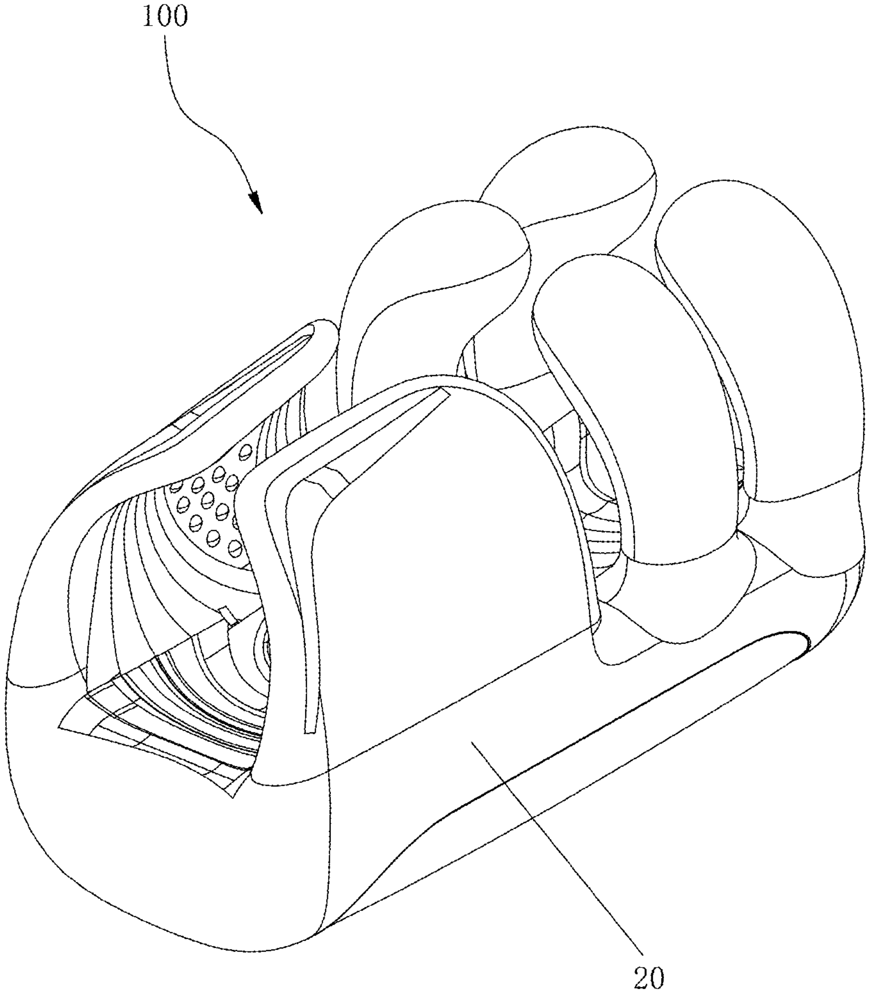
FIG. 1 is an isometric, assembled view of a sex toy according to a first embodiment of the present application.
Figure 2:
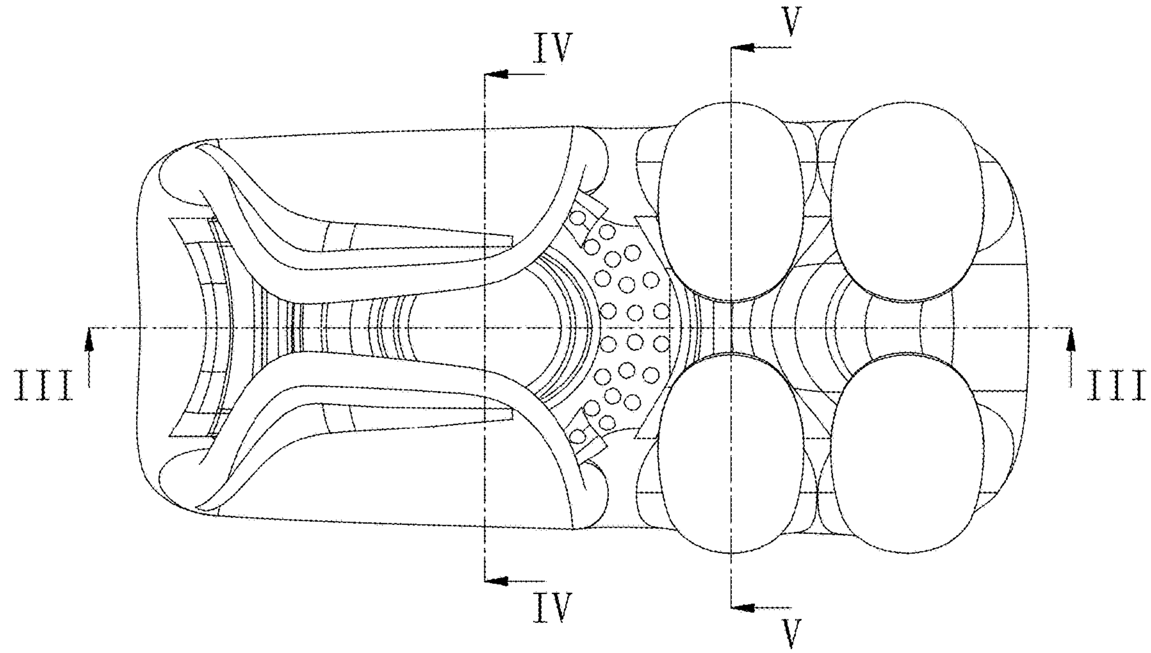
FIG. 2 is a top plan view of the sex toy of FIG. 1.

As shown in FIG. 1, the shell 20 in whole is configured as a human hand, which includes a palm and several fingers extending from the palm. Preferably, the shell 20 is a double-layer structure, and includes an outer shell 22 and an inner shell 24 inside the outer shell 22. The inner shell 24 may be made of hard materials, such as plastic, metal and etc., providing support to the stimulation modules mounted inside the shell 20; and the outer shell 22 may be made of soft materials, such as silicone, rubber and etc., for directly contacting a part of the human body which needs to be stimulated, thereby the sex toy 100 in whole has high strength and comfortable use experience.

Figure 6:
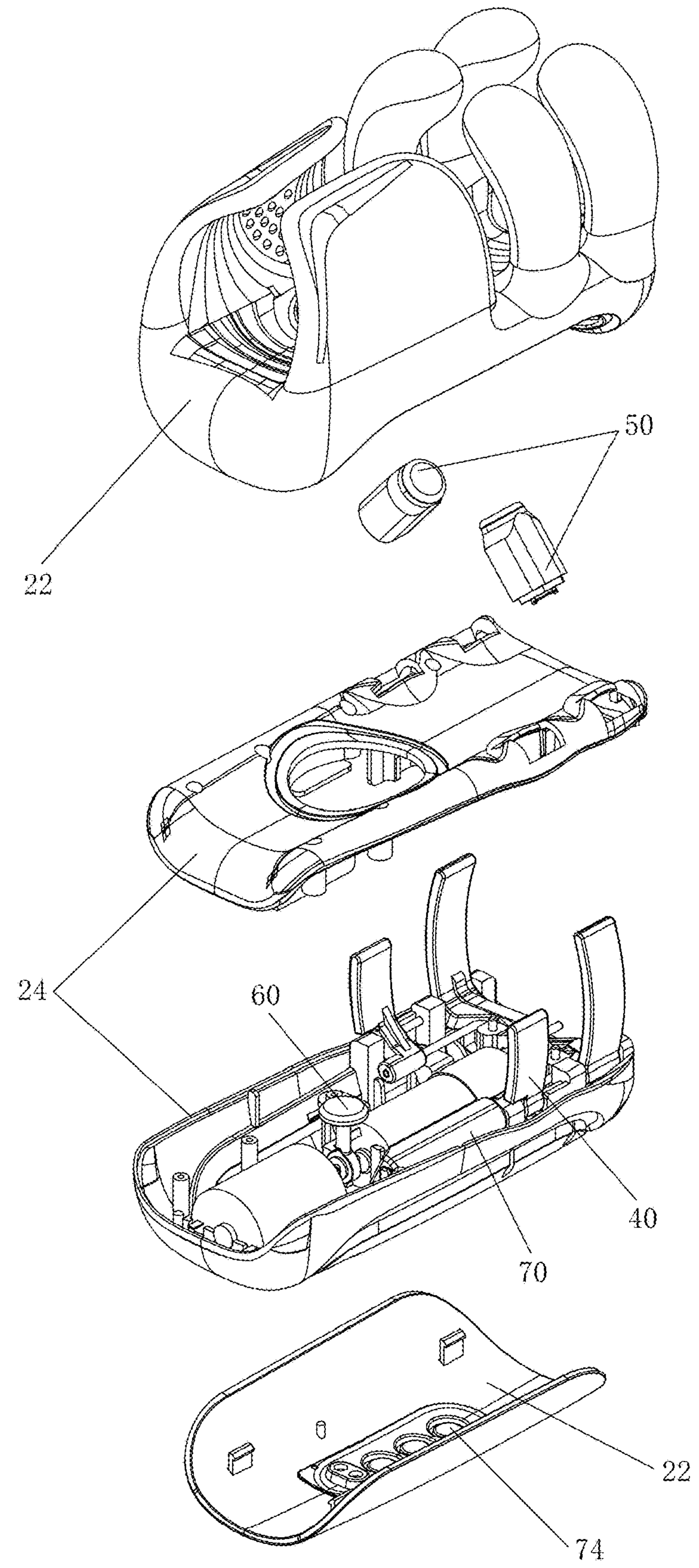
FIG. 6 is an isometric, exploded view of the sex toy of FIG. 1.
Figure 7:
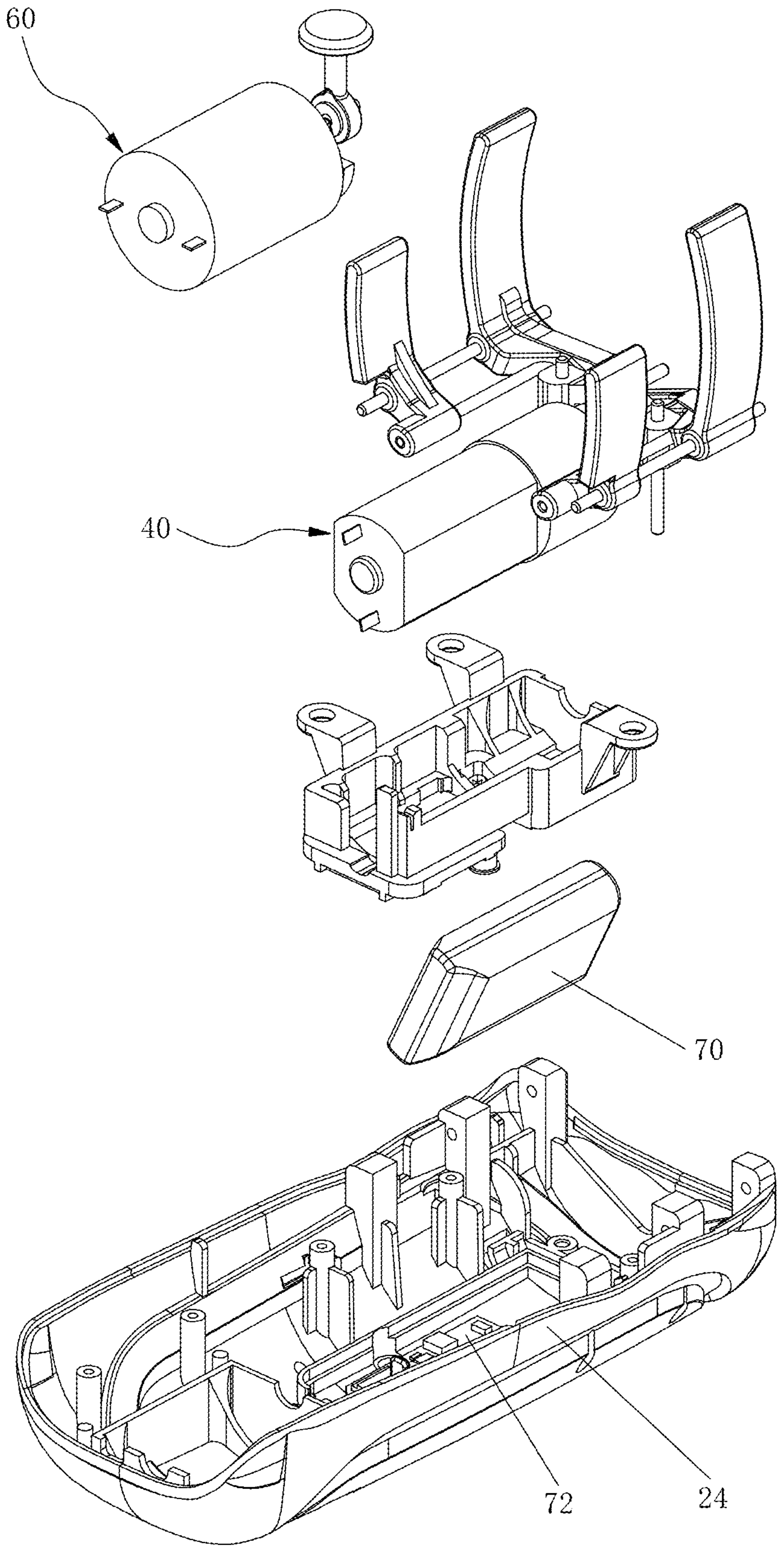
FIG. 7 is a further exploded view of the sex toy of FIG. 1, wherein an outer shell and an upper portion of an inner shell are removed.

Referring to FIG. 6 and FIG. 7, the stimulation modules of this embodiment includes a first stimulation module 40, a second stimulation module 50 and a third stimulation module 60.

Figure 8:
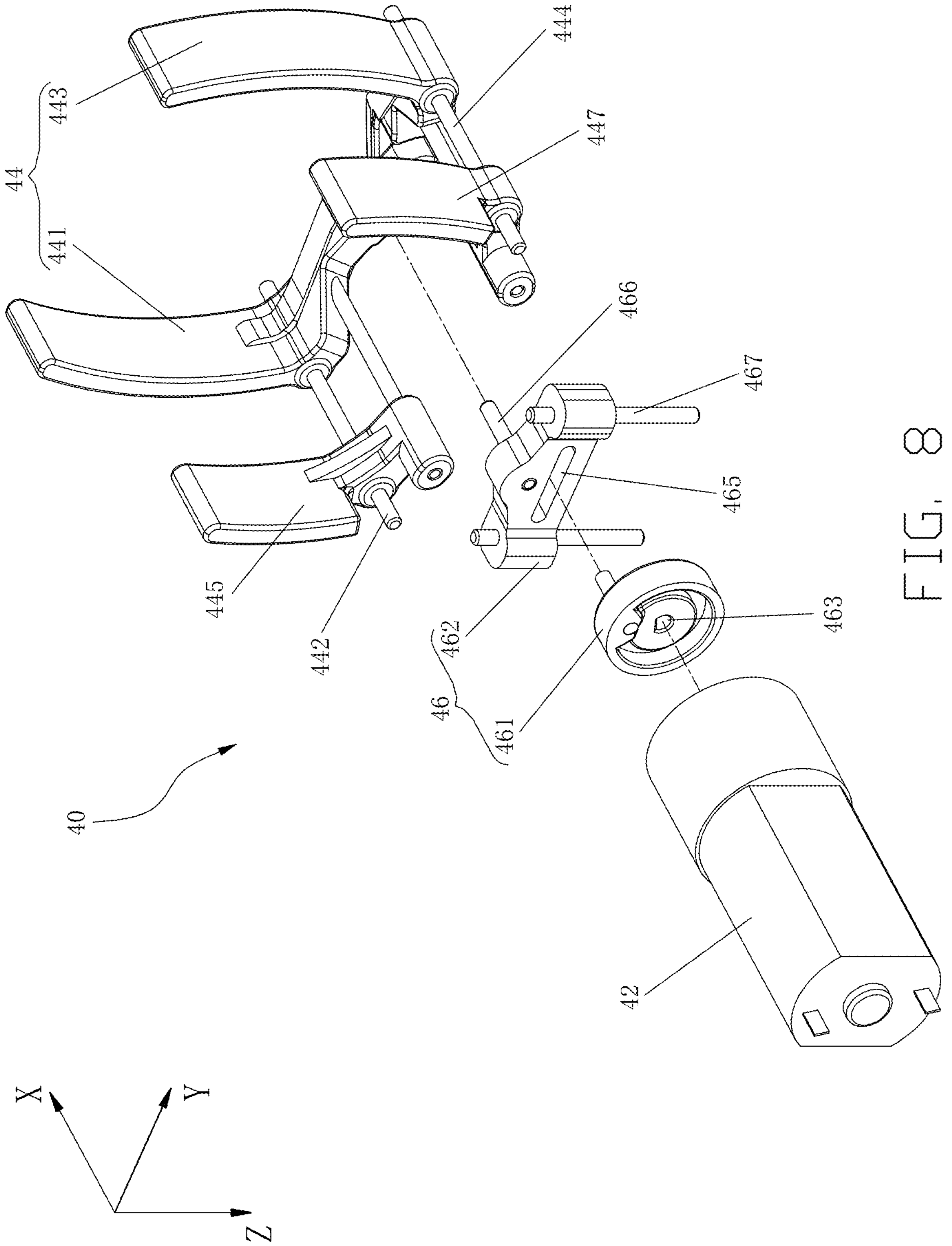
FIG. 8*a* shows the first stimulation module of FIG. 8 from another aspect.
Figure 8A:
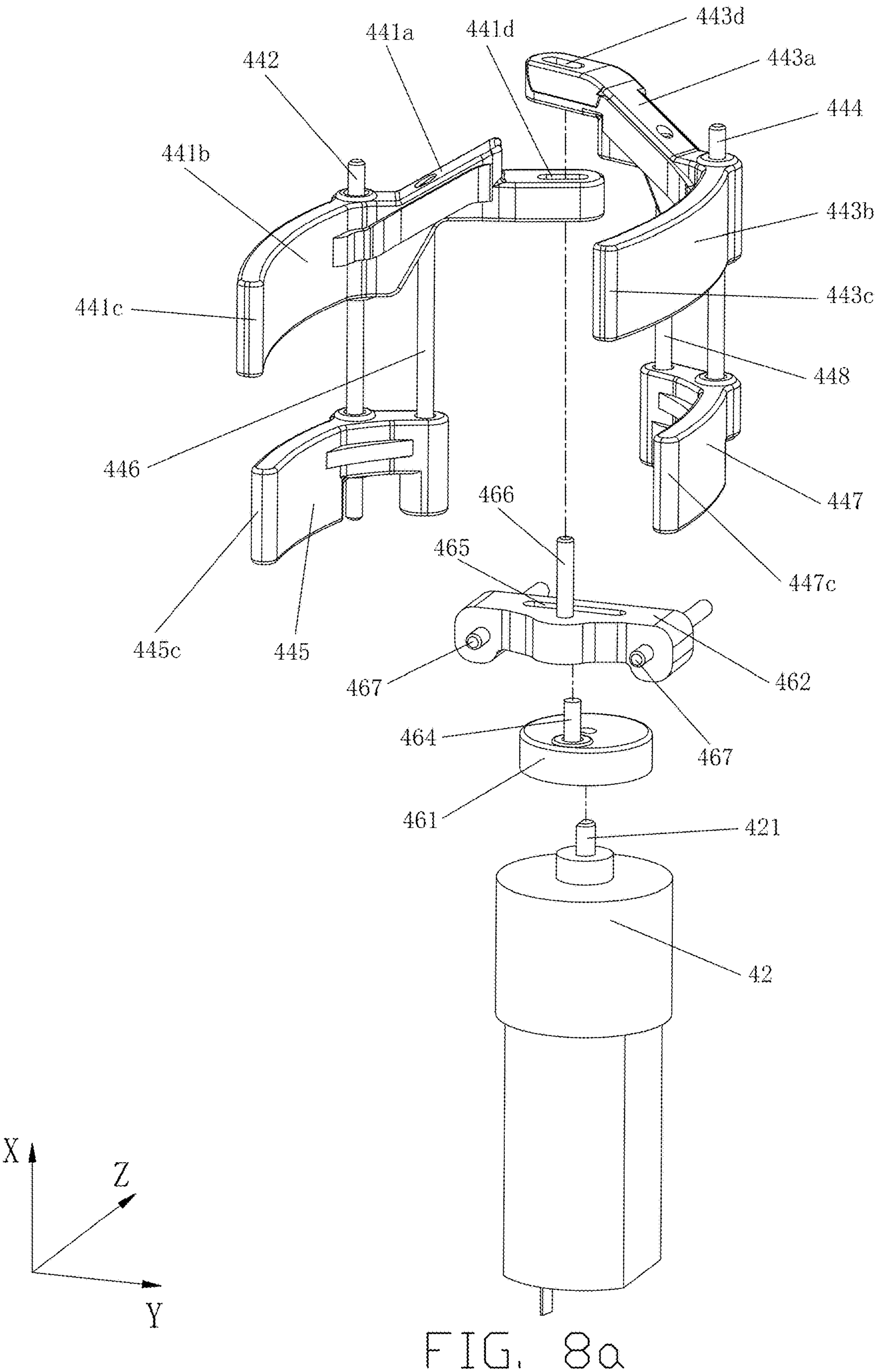

As shown in FIGS. 8 and 8*a*, the first stimulation module 40 includes a first motor 42, a swinging unit 44 and a transmission unit 46 connected between the first motor 42 and the swinging unit 44. The swinging unit 44 includes a first swinging bar 441 and a second swinging bar 443 which are substantially arranged symmetric to each other. During operation of the first motor 42, the first swinging bar 441 and second swinging bar 443 are driven to swing relative to the shell 20, close to or away from each other, thereby achieving an occlusion action to occlude a sensitive part of the human body put between the first swinging bar 441 and second swinging bar 443.

The first swinging bar 441 includes a first connecting arm 441*a* and a first swinging arm 441*b* which are connected to each other. Preferably, the first connecting arm 441*a* and the first swinging arm 441*b* are integrally formed as one piece, and an included angle is set therebetween. A joint portion of the first connecting arm 441*a* and the first swinging arm 441*b* is rotatably connected to the inner shell 24 by a first pivot 442. A distal end of the first connecting arm 441*a* away from the first swinging arm 441*b* is connected to the transmission unit 46, and a distal end of the first swinging arm 441*b* away from the first connecting arm 441*a* is configured as a first swinging end 441*c*.

Similarly, the second swinging bar 443 includes a second connecting arm 443*a* and a second swinging arm 443*b* which are connected to each other and angled with each other. A joint portion of the second connecting arm 443*a* and the second swinging arm 443*b* is rotatably connected to the inner shell 24 by a second pivot 444. A distal end of the second connecting arm 443*a* away from the second swinging arm 443*b* is connected to the transmission unit 46, and a distal end of the second swinging arm 443*b* away from the second connecting arm 443*a* is configured as a second swinging end 443*c*. The distal ends of the first and second connecting arms 441*a*, 443*a* can move along a first direction, such as Z-direction, and thus the first and second swinging arms 441*b*, 443*b* can swing about the first pivot 442 and second pivot 444, respectively.

The first pivot 442 and second pivot 444 both extend along a second direction, such as X-direction, being parallel to and spaced from each other. The first swinging end 441*c* and the second swinging end 443*c* are opposite to each other in a third direction, such as Y-direction. During operation, the first motor 42 drives the distal ends of the first connecting arm 441*a* and the second connecting arm 443*a* to do reciprocating movement synchronously in the Z-direction through the transmission unit 46, making the first swinging bar 441 swing about the first pivot 442 and the second swinging bar 443 swing about the second pivot 444, thereby the first swinging end 441*c* and second swinging end 443*c* swinging towards or away from each other to achieve the occlusion action.

In this embodiment, the swinging unit 44 further includes a third swinging bar 445 and a fourth swinging bar 447 which are arranged substantially symmetric to each other. The first pivot 442 extends through a middle portion of the third swinging bar 445 to rotatably connect the third swinging bar 445 to the inner shell 24, and the second pivot 444 extends through a middle portion of the fourth swinging bar 447 to rotatably connect the fourth swinging bar 447 to the inner shell 24. The first pivot 442 may be fixed to the first and third swinging bars 441, 445 to rotate along therewith, or, may be fixed to the inner shell 24; and the second pivot 444 may be fixed to the second and fourth swinging bars 443, 447 to rotate along therewith, or, may be fixed to the inner shell 24.

The third swinging bar 445 has one end configured as a third swinging end 445*c*, and another end being fixedly connected to the first connecting arm 441*a* of the first swinging bar 441 by a third pivot 446, thereby the third swinging bar 445 can swing about the first pivot 442 together with the first swinging bar 441; and the fourth swinging bar 447 has one end configured as a fourth swinging end 447*c*, and another end being fixedly connected to the second connecting arm 443*a* of the second swinging bar 443 by a fourth pivot 448, thereby the fourth swinging bar 447 can swing about the second pivot 444 together with the second swinging bar 443. The third swinging end 445*c* and the fourth swinging end 447*c* are opposite to each other in the Y-direction, which can swing towards or away from each other to achieve an occlusion action.

In this embodiment, corresponding to the first to fourth swinging ends 441*c*, 442*c*, 445*c*, 447*c* of the first to fourth swinging bars 441, 443, 445, 447 of the swinging unit 44 of the first stimulation module 40, the shell 20, specifically the outer shell 22, is provided with four fingers which accommodate the four swinging ends 441*c*, 442*c*, 445*c*, 447*c* therein, respectively and act as swinging portions of the sex toy. During operation, the fingers swing together with the swinging ends 441*c*, 442*c*, 445*c*, 447*c* to occlude the sensitive part of the human body put thereamong. Such sex toy is preferably suitable for males, which can simulate a human hand to hold and pinch the male genitalia.

Figure 9:
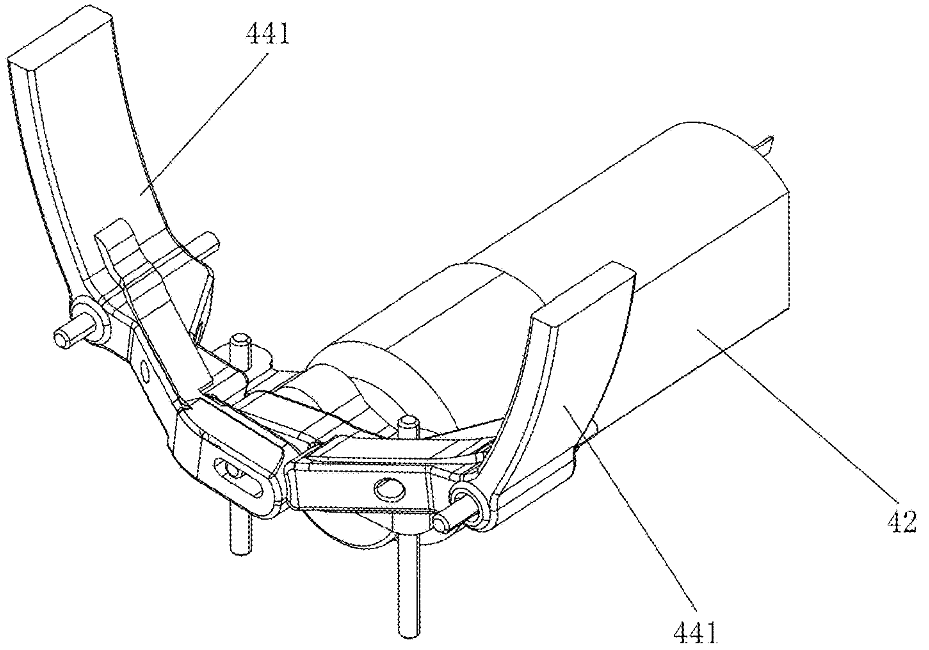
FIG. 9 is a schematic view of a second embodiment of the first stimulation module.
Figure 9A:
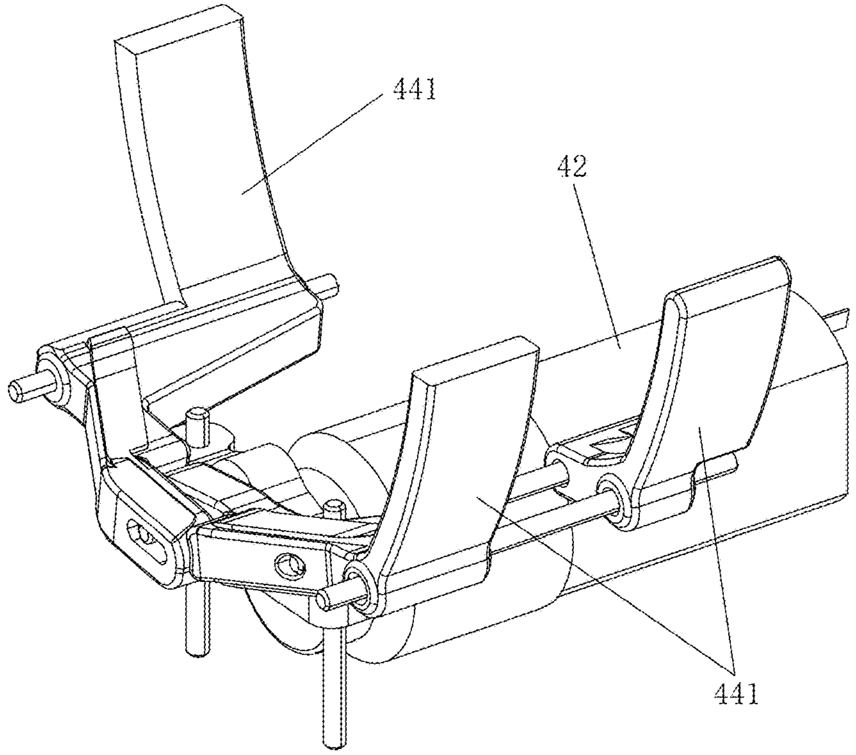
FIG. 9*a* is a schematic view of a third embodiment of the first stimulation module.
Figure 9B:
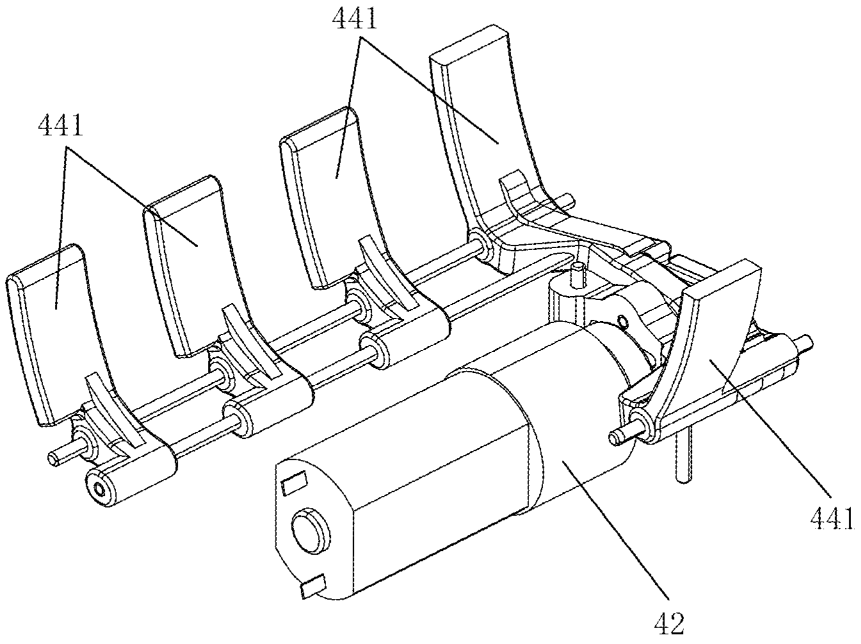
FIG. 9*b* is a schematic view of a fourth embodiment of the first stimulation module.
Figure 9C:
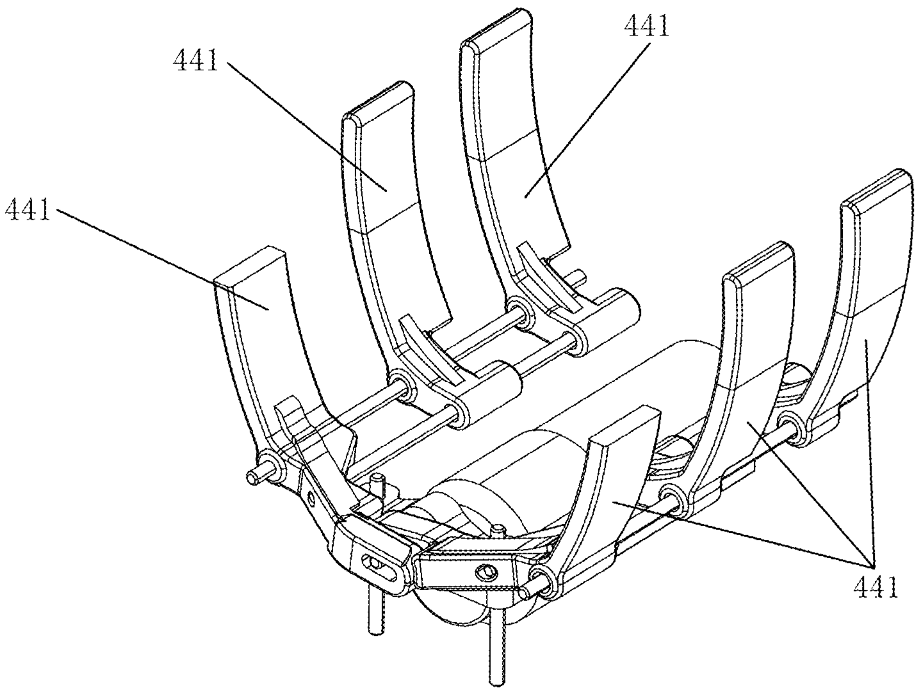
FIG. 9*c* is a schematic view of a fifth embodiment of the first stimulation module.

It should be understood that the swinging bars are preferably multiple, such as two, three, four, six, eight, etc., not limited to specific embodiments, and a number of the swinging portions of the shell may be designed the same as that of the swinging bars, thereby accommodating and swinging together with the swinging ends, respectively. FIG. 9 shows a sex toy with two swinging bars 441, wherein the two swinging bars 441 are arranged substantially symmetric to each other in the Y-direction. FIG. 9*a* shows a sex toy with three swinging bars 441, wherein one swinging bar 441 is located at one side, and two swinging bars 441 are located at an opposite side. The three swinging bars 441 are staggered in the X-direction. FIG. 9*b* shows a sex toy with five swinging bars 441, wherein one swinging bar 441 is at one side, and four swinging bars 441 are at the opposite side. FIG. 9*c* shows a sex toy with six swinging bars 441, wherein each side is provided with three swinging bars 441.

In this embodiment, the first motor 42 is a rotary motor, and has a rotary shaft 421 for outputting torque. The transmission unit 46 is configured for converting rotation of the first motor 42 into reciprocating movement along the first direction, thereby driving the distal ends of the first and second connecting arms 441*a*, 443*a* to move in the first direction. The transmission unit 46 includes a first eccentric wheel 461 and a sliding block 462.

The first eccentric wheel 461 is connected to the rotary shaft 421 of the first motor 42. In this embodiment, the first eccentric wheel 461 is generally circular-shaped, and a central hole 463 is defined in a central portion thereof for inserting of the rotary shaft 421 therein. The central hole 463 of the first eccentric wheel 461 is non-circular shaped, such as D-shaped, and a cross section of the rotary shaft 421 has a shape matching with that of the central hole 463. After inserting of the rotary shaft 421 into the central hole 463 of the first eccentric wheel 461, a relative rotation therebetween is limited for shape matching, thereby the first eccentric wheel 461 can rotate along with the rotary shaft 421 of the first motor 42.

A first rod 464 extends outwardly from a periphery of the first eccentric wheel 461, that is, the first rod 464 is set eccentrically on the first eccentric wheel 461. Generally, the first rod 464 is parallel to the rotary shaft 421 of the first motor 42. During rotation of the first eccentric wheel 461 along with the rotary shaft 421 of the first motor 42, the first rod 464 revolves round the rotary shaft 421. In this embodiment, the rotary shaft 421 extends along the X-direction, and the first rod 464 revolves round the rotary shaft 421 in YZ plane. In other words, the first rod 464 generates displacements on both the Y-direction and the Z-direction under the driving of the first motor 42.

The sliding block 462 defines a sliding groove 465 therein, which is strip-shaped and elongated in the Y-direction. The first rod 464 engages into the sliding groove 465, and is fixed relative to the sliding block 462 in the Z-direction whilst is slidable relative to the sliding block 462 in the Y-direction. During revolving of the first rod 464 round the rotary shaft 421, its displacement in the Y-direction can not drive the sliding block 462 to move, while its displacement in the Z-direction drives the sliding block 462 to do reciprocating movement. Thereby, rotation of the first motor 42 is converted to reciprocating liner motion of the sliding block 462 in the Z-direction.

In this embodiment, the distal end of the first connecting arm 441*a* defines a first slot 441*d* therein, and the distal end of the second connecting arm 443*a* defines a second slot 443*d* therein. A second rod 466 extends outwardly from the sliding block 462 along the X-direction, and is movably engaged into the first slot 441*d* and the second slot 443*d*, thereby the sliding block 462 can drive the distal ends of the first and second connecting arms 441*a*, 443*a* to do reciprocating movement synchronously in the Z-direction. The first and second slots 441*d*, 443*d* may be strip-shaped in an extension direction of the first and second connecting arms 441*a*, 443*a*, thereby the second rod 466 having more movement allowance in the first and second slots 441*d*, 443*d*.

In this embodiment, the sliding block 462 is movably connected to the inner shell 24 by a fifth pivot 467 which extends along the Z-direction. The fifth pivot 467 movably extends through the sliding block 462, thereby guiding movement of the sliding block 462 in the Z-direction. Preferably, each end of the sliding block 462 in the Y-direction is provided with one fifth pivot 467, thus a movement of the sliding block 462 in the Z-direction can be more stable, and accordingly swinging of the swinging ends 441*c*, 442*c*, 445*c*, 447*c* of the swinging unit 44 driven by the second rod 466 of the sliding block 462 can be more consistent and powerful. That is to say, the stimulation intensity of each finger of the sex toy 100 is more consistent and the overall stimulation effect is better.

Figure 5:
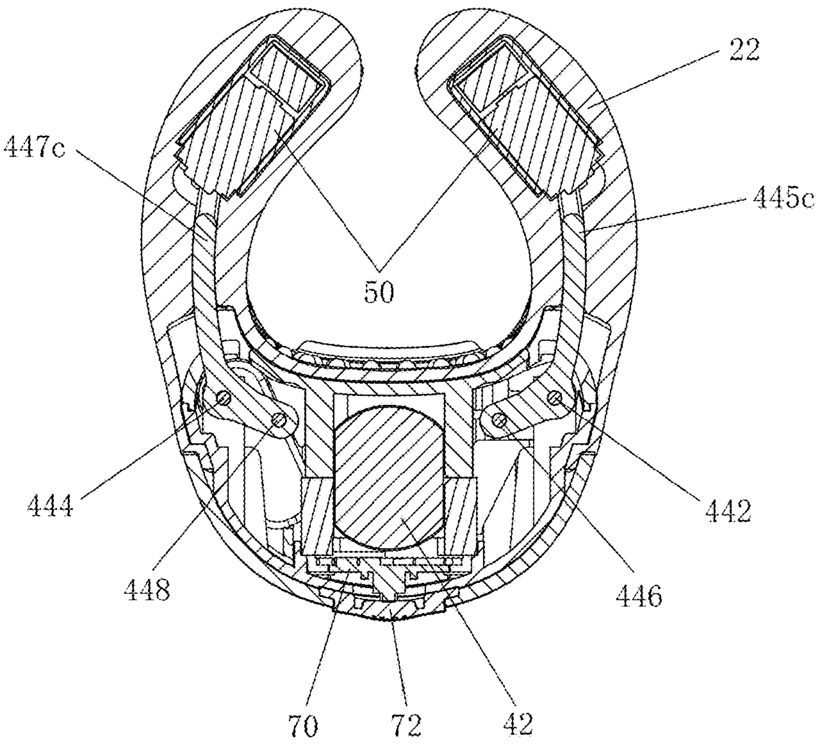
FIG. 5 is a cross sectional view of the sex toy taken along line V-V of FIG. 2.

As shown in FIG. 5 and FIG. 6, the second stimulation module 50 includes at least one second motor, which may be vibration motor for generating high-frequency vibration to the sensitive part of the human body put between the fingers. The second stimulation module 50 is set in the fingers of the shell 20, and is located adjacent to fingertips. Preferably, the second stimulation module 50 includes several second motors, and each second motor is set in one of the fingers. The second motors may be set in some of the fingers, or may be set in each of the fingers. During in use, the first stimulation module 40 may be started separately, the second stimulation module 50 may be started separately, and the first and second stimulation modules 40, 50 may be started at the same time.

Figure 10:
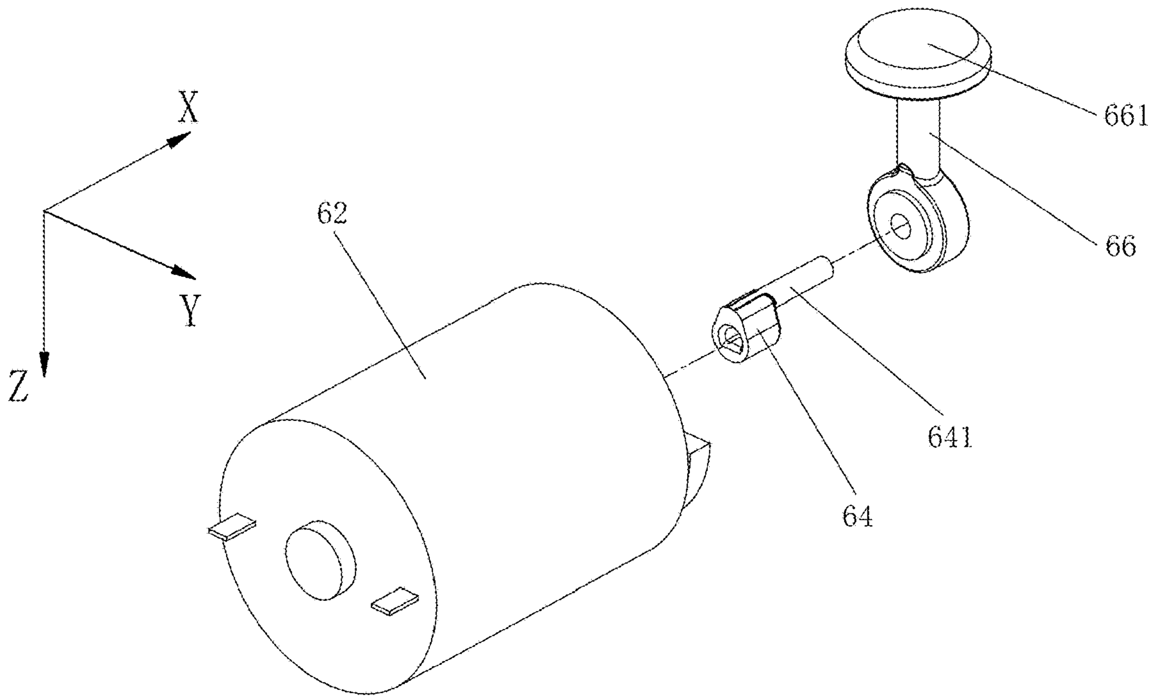
FIG. 10 is a further exploded view of a third stimulation module of the sex toy of FIG. 1.
Figure 11:
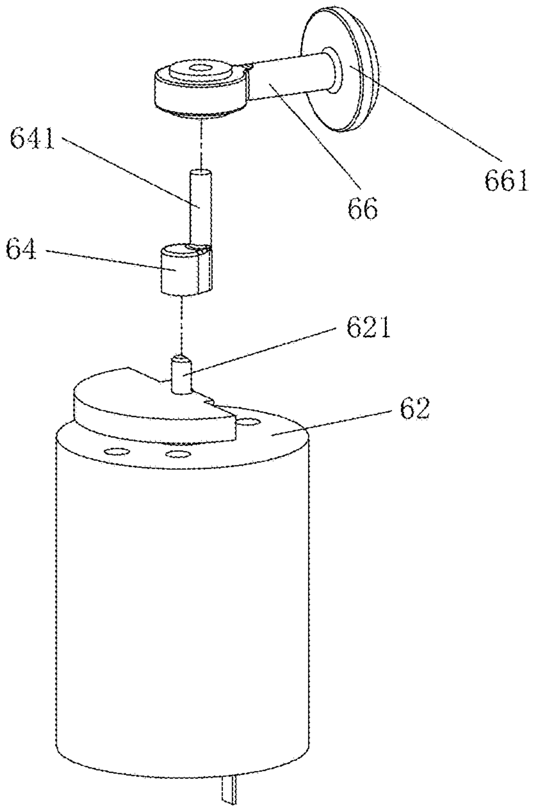
FIG. 11 shows the third stimulation module of FIG. 10 from another aspect.

As shown in FIG. 10 and FIG. 11, the third stimulation module 60 includes a third motor 62 with an output shaft 621, a third eccentric wheel 64 connected to the output shaft 621 of the third motor 62, and a swinging rod 66 connected to the third eccentric wheel 64. The third eccentric wheel 64 has a third rod 641 extending out therefrom, and the third rod 641 is parallel to the output shaft 621 of the third motor 62. The swinging rod 66 is generally perpendicular to the third rod 641, with one end thereof being rotatably mounted around the third rod 641 and another end thereof embedded into the shell 20, specifically a portion of the outer shell 22 at the palm. Preferably, a head 661 with a diameter larger than other portions of the swinging rod 66 is formed at the another end of the swinging rod 66, improving a stability of the connection between the swinging rod 66 and the outer shell 22.

Figure 3:
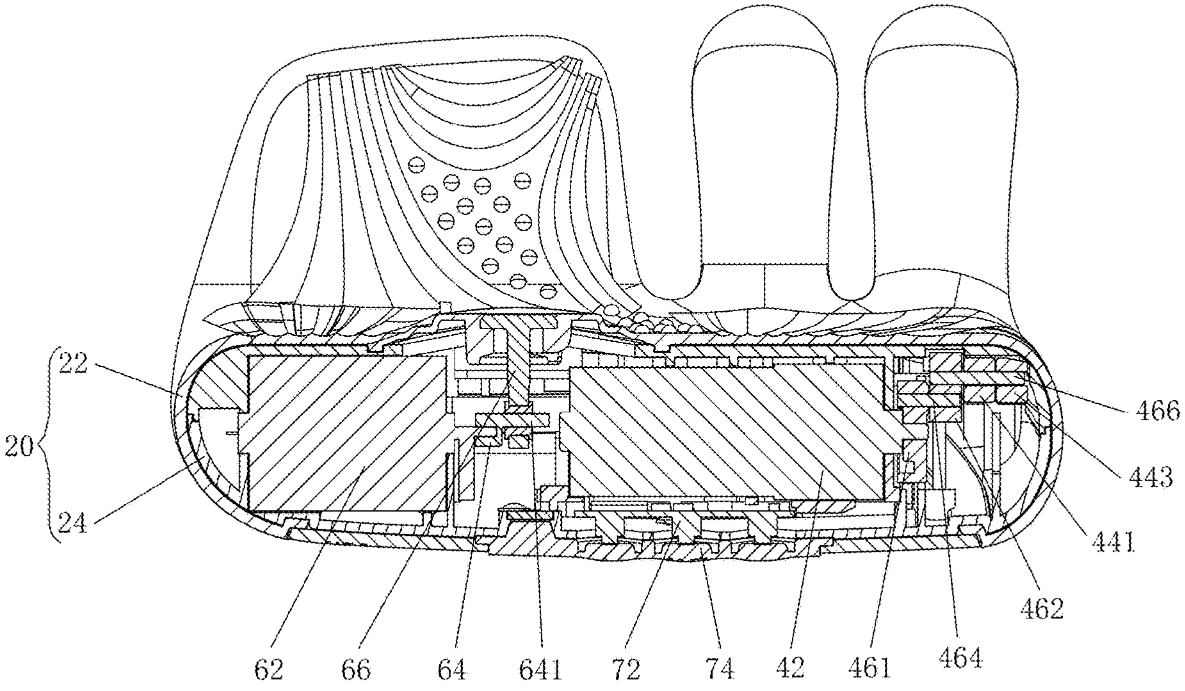
FIG. 3 is a cross sectional view of the sex toy taken along line III-III of FIG. 2.
Figure 4:
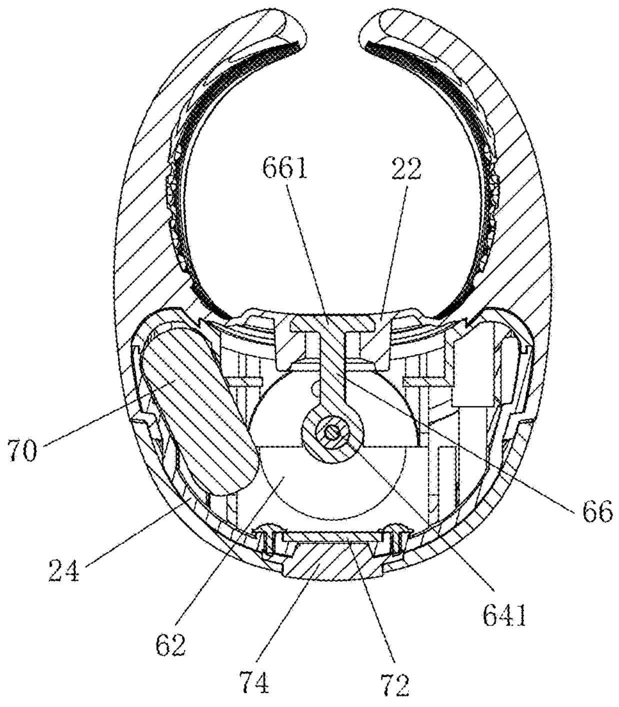
FIG. 4 is a cross sectional view of the sex toy taken along line IV-IV of FIG. 2.

Referring also to FIG. 3 and FIG. 4, the output shaft 621 of the third motor 62 and the third rod 641 of the third eccentric wheel 64 both extend along the X-direction, and the swinging rod 66 extends along the Z-direction. During operation, rotation of the third motor 62 is converted into revolving of the swinging rod 66 about the output shaft 621, and then converted into reciprocating movement in the Z-direction of the swinging rod 66 and a portion of the outer shell 22 corresponding to the head 661 of the swinging rod 66 since the swinging rod 66 is limited to move in the X-direction and Y-direction for the engagement with the shell 20. At the same time, a relative rotation is generated between the swinging rod 66 and the third rod 641. That is, the third stimulation module 60 provides reciprocating motion in the Z-direction to drum a part of the human body nestled to the head 661.

The first, second and third stimulation modules 40, 50, 60 provide stimulation to the sensitive areas of the human body in different manners and thus can achieve better stimulation effects. It should be understood that the third stimulation module 60 may be started separately, or may be used with the first stimulation module 40 and/or second stimulation module 50 at the same time. For enhance user comfort, the fingers of the shell 20 which accommodate the swinging ends 441*c*, 442*c*, 445*c*, 447*c* of the first stimulation module

40 and the second stimulation module 50 and a portion of the palm of the shell 20 which accommodates the head 661 of the swinging rod 66 of the third stimulation module 60 are constructed as a soft single-layer structure, i.e., without the hard inner shell 24.

Referring to FIG. 6 and FIG. 7 again, a battery 70, preferably a rechargeable battery, is arranged in the shell 20 for supplying electric power to electric components, such as the first, second and third motors 42, 50, 62, of the sex toy 100. Further, a control circuit board 72 is mounted in the shell 20 and electrically connected to the first, second and third motors 42, 50, 62 for controlling their operation according to user's instructions, such as controlling the vibration frequency of the second motor 50, controlling the rotary speed of the first and third motors 42, 62, and etc. Control buttons 74, such as mechanical buttons or touch buttons, may be provided on the outer shell 22 for input the user's instructions.

Figure 12:
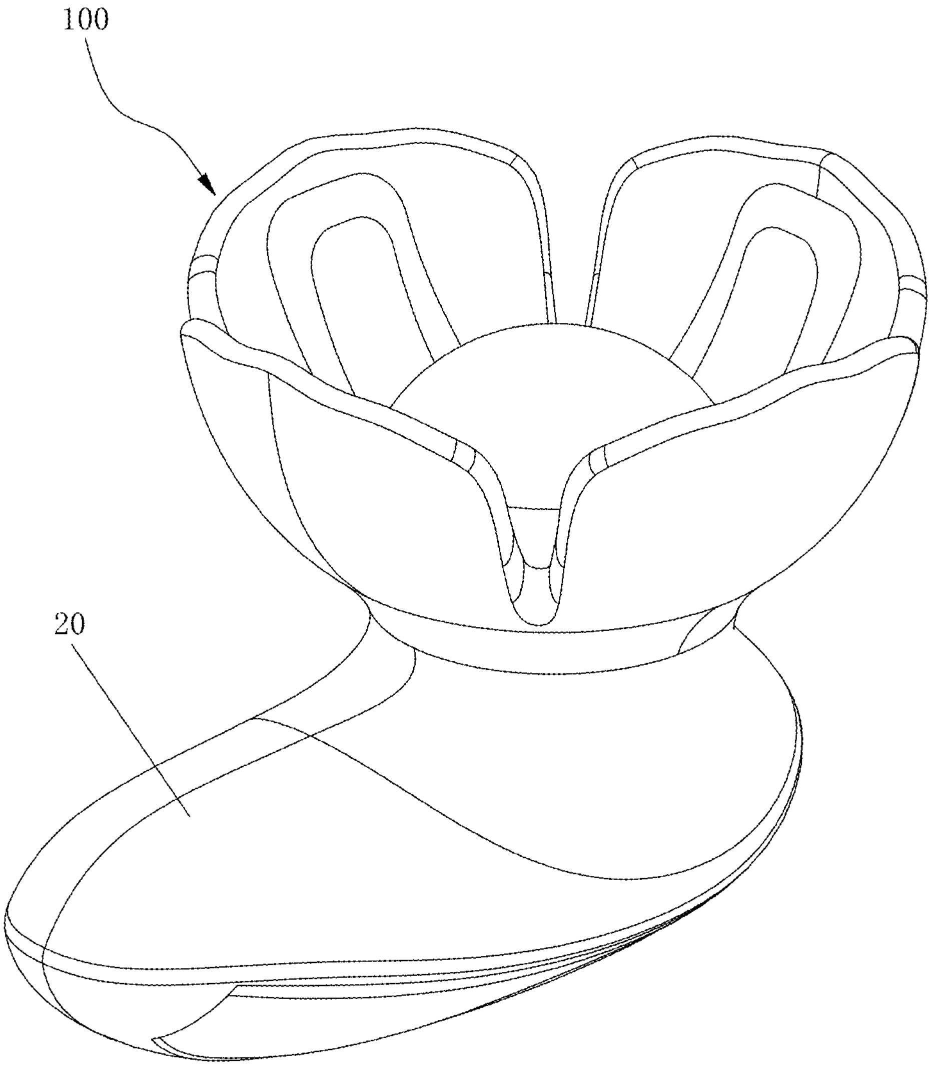
FIG. 12 is an isometric, assembled view of a sex toy according to a second embodiment of the present application.
Figure 13:
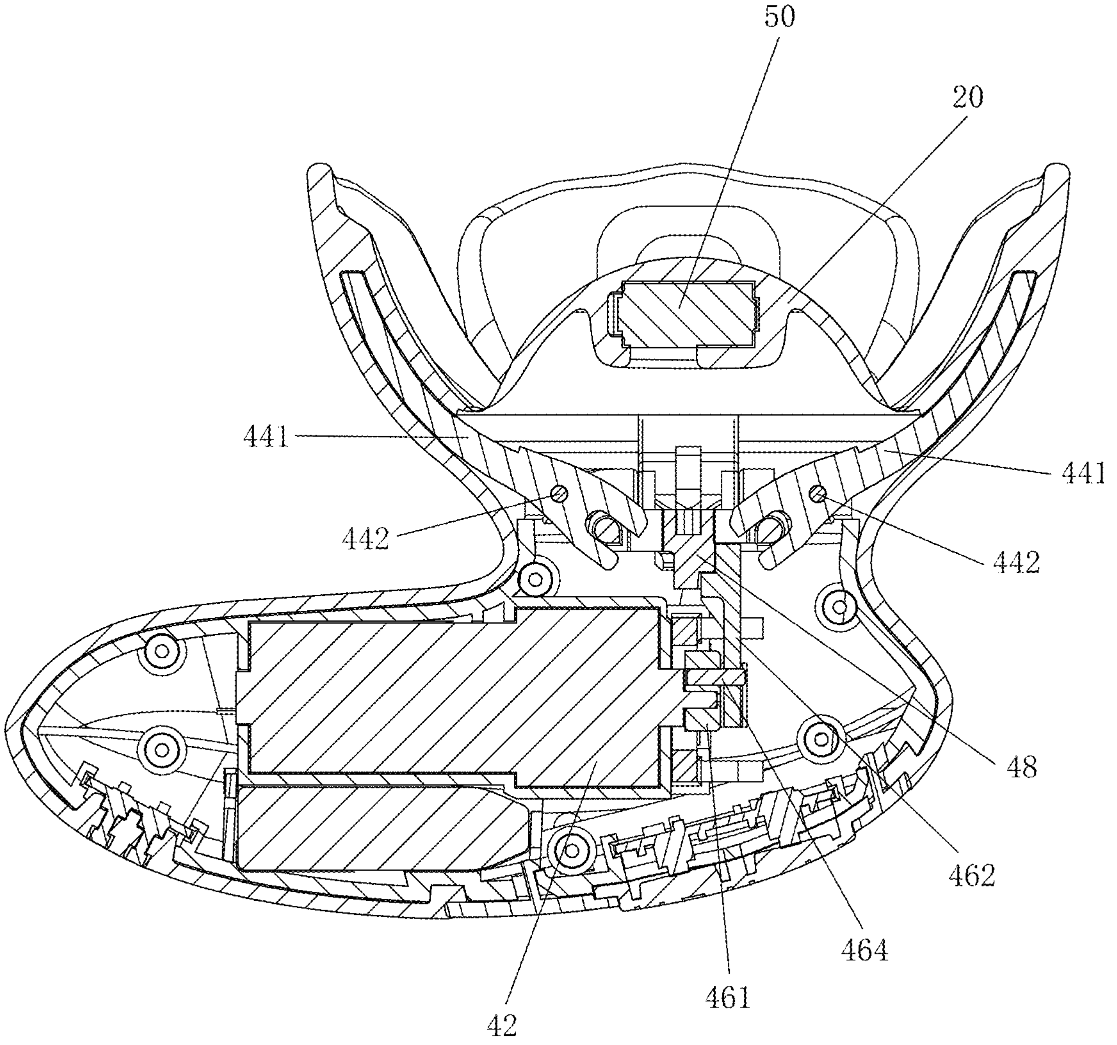
FIG. 13 is a cross sectional view of the sex toy of FIG. 12.
Figure 14:
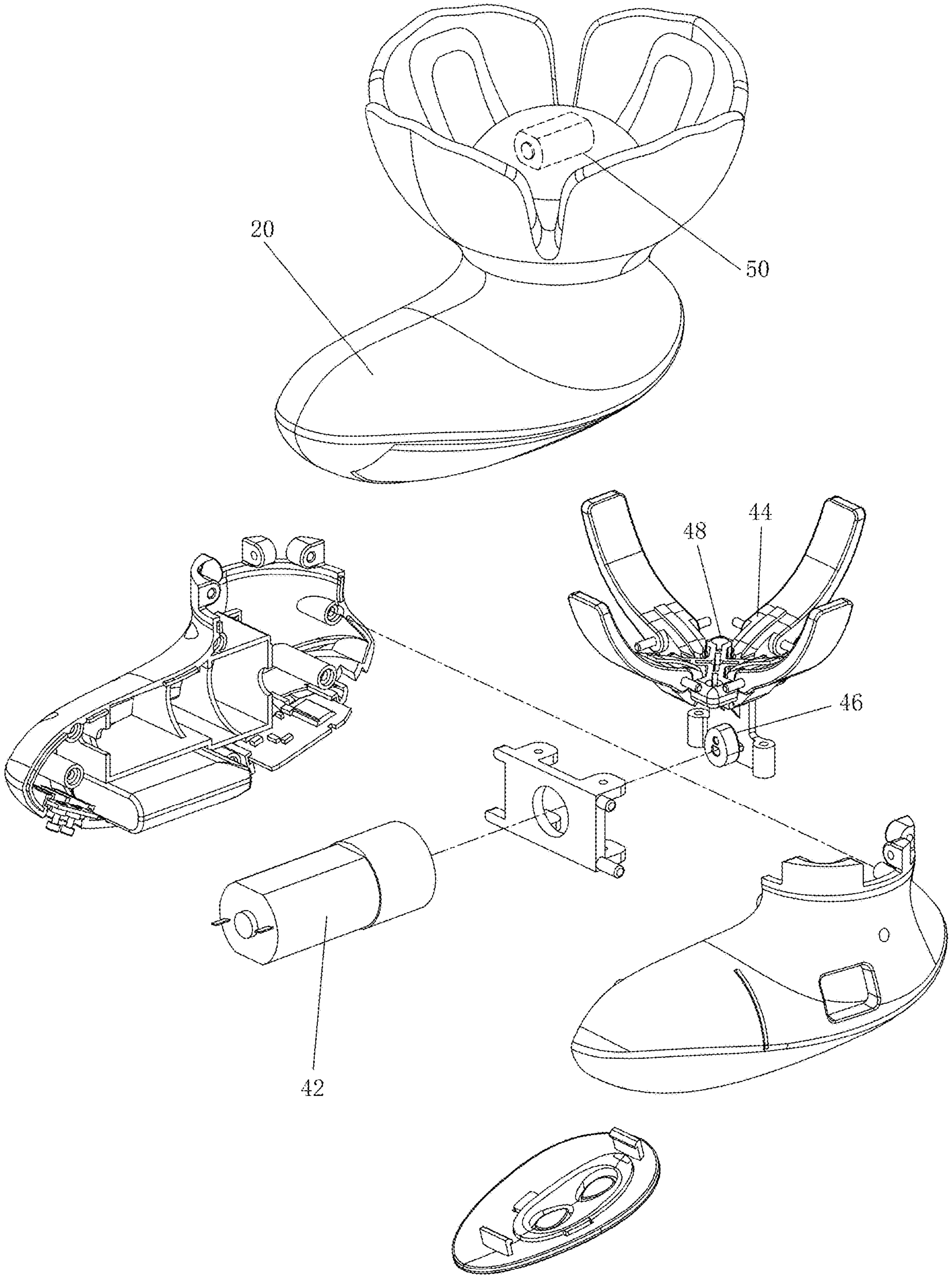
FIG. 14 is an exploded view of the sex toy of FIG. 12.

Referring to FIGS. 12-14, a sex toy 100 according to a second embodiment of the present application is shown. In this embodiment, the sex toy 100 includes a shell 20 being substantially configured as a flower in bloom, and first and second stimulation modules 40, 50 mounted in the shell 20.

Figure 15:
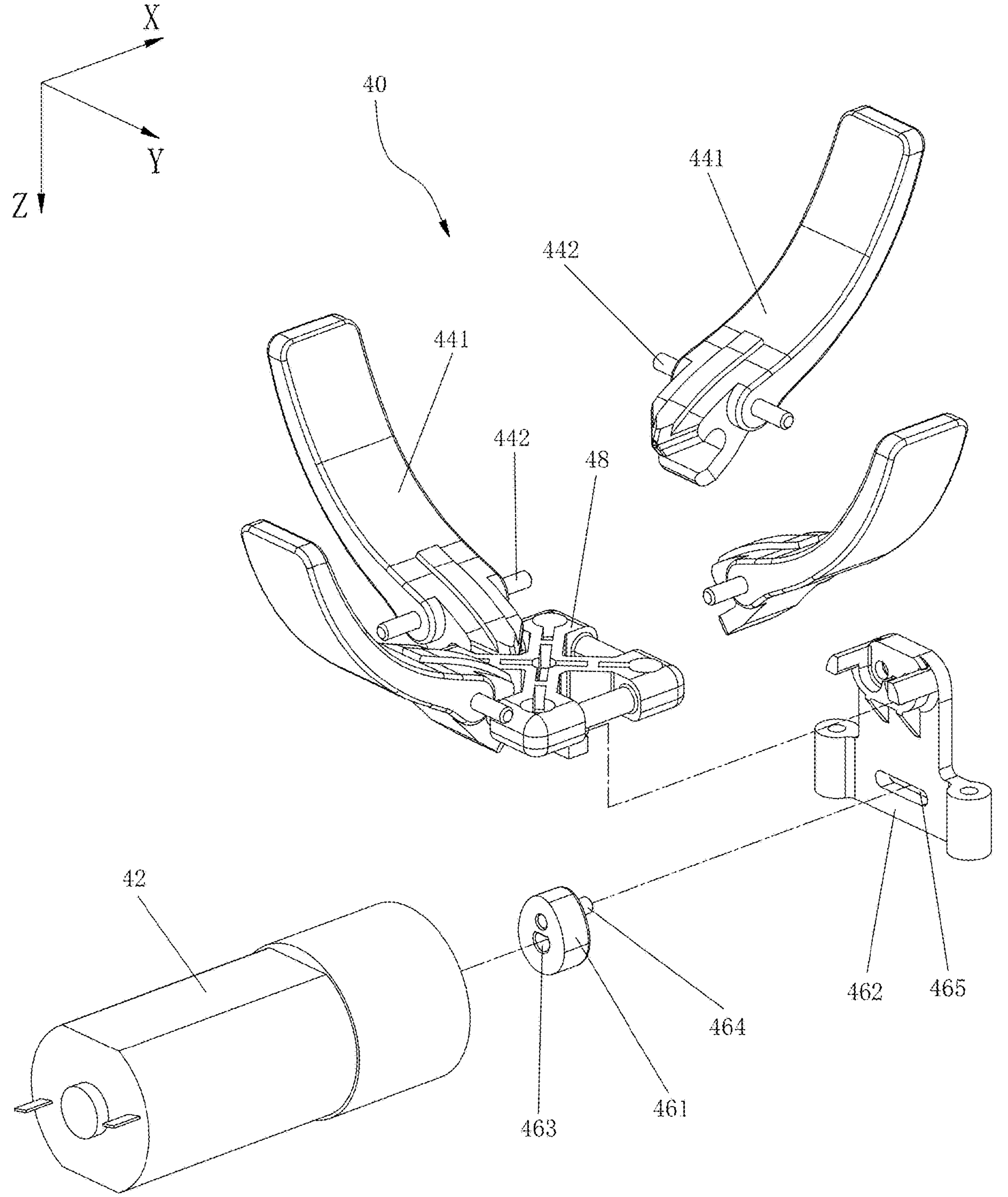
FIG. 15 is a further exploded view of a first stimulation module of the sex toy of FIG. 13.
Figure 15A:
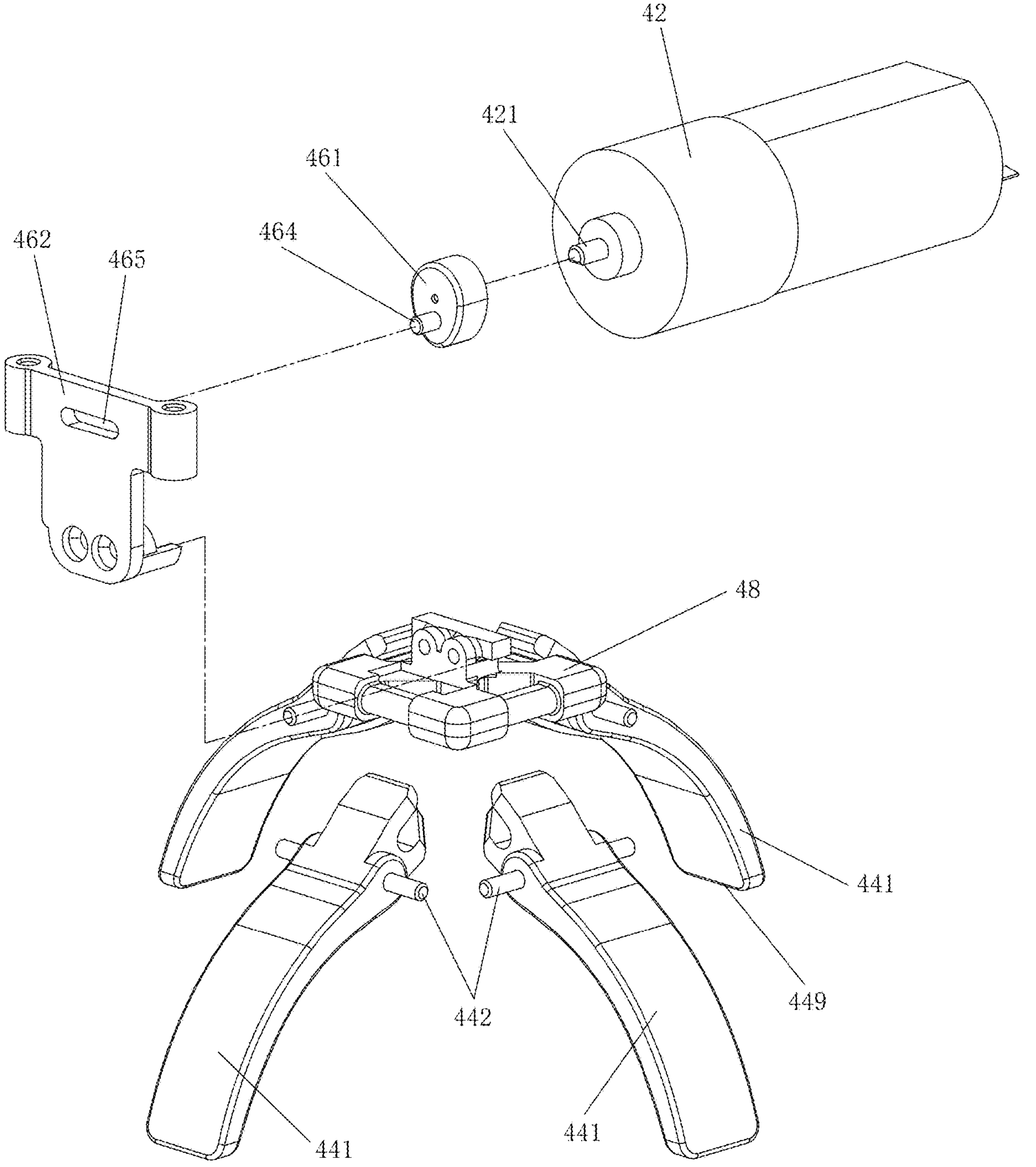
FIG. 15*a* shows the first stimulation module of FIG. 15 from another aspect.

As shown in FIGS. 15 and 15*a*, the first stimulation module 40 includes a first motor 42, a swinging unit 44, and a transmission unit 46 connected between the first motor 42 and the swinging unit 44. The transmission unit 46 includes a first eccentric wheel 461 connected to a rotary shaft 421 of the first motor 42 at a central portion thereof and a sliding block 462 defining a sliding groove 465 for accommodating a first rod 464 of the first eccentric wheel 461, wherein the first rod 464 extends along the X-direction and is set eccentrically on the first eccentric wheel 461, and the sliding groove 465 is elongated along the Y-direction. Rotation of the first motor 42 is converted into linear reciprocating motion of the sliding block 462 in the Z-direction by the transmission unit 46.

In this embodiment, the swinging unit 44 includes several swinging bars 441, and each of the swinging bars 441 is rotatably connected to the inner shell 24 by a pivot 442. Further, a support frame 48 is provided for rotatably connecting the swinging bars 441 to the sliding block 463. Specifically, each swinging bar 441 has a connecting end being rotataly connected to a lateral side of the support frame 48 and an opposite end being configured as a swinging end 449, wherein the swinging end 449 extends into a flower petal of the shell 20. The pivot 442 is adjacent to the connecting end of the swinging bar 441 which is connected to the support frame 48, thereby the swinging end 449 of the swinging bar 441 getting a greater swing amplitude.

Figure 16:
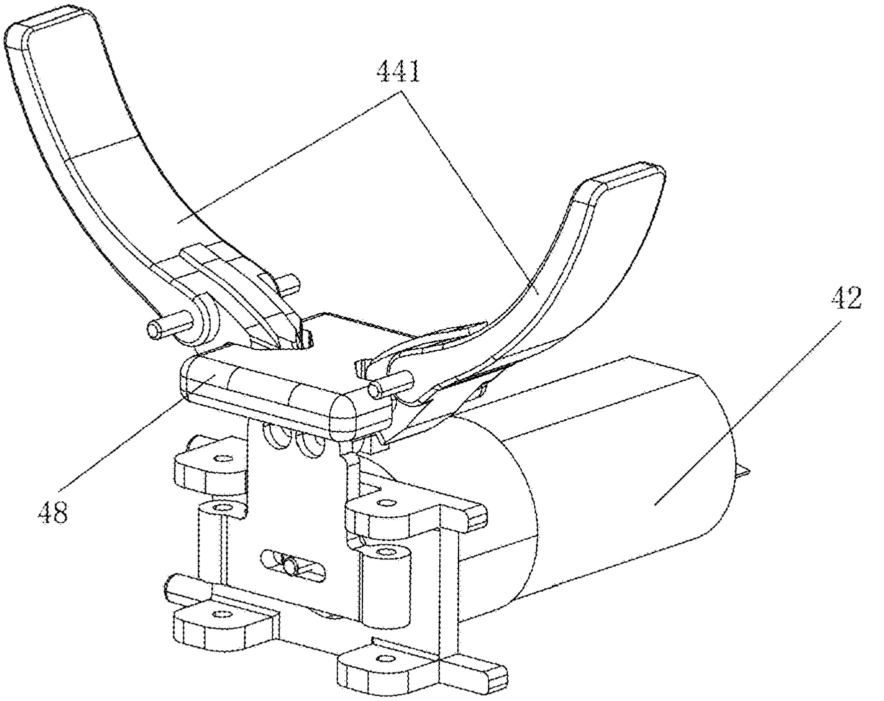
FIG. 16 is a schematic view of the first stimulation module according to another embodiment.

In this embodiment, the support frame 48 is generally constructed as a polygon structure with a number of lateral sides the same as the number of the swinging bars 441. As shown in FIG. 16, the support frame 48 is generally square-shaped, and four swinging bars 441 are provided to connect four lateral sides of the support frame 48, respectively. Correspondingly, the outer shell 22 includes four flower petals arranged around a flower core, and each flower petal is configured for accommodating the swinging end 449 of one of the four swinging bars 441 therein. The second stimulation module 50 may be a vibration motor, and is mounted in the flower core of the outer shell 22. That is, the swinging ends 449 of the first stimulation module 40 are arranged around the vibration motor/second stimulation module 50.

The support frame 48 may be formed separately and then assembled to the sliding block 462, or, may be integrally formed with the sliding block 462 as one piece, as long as the support frame 48 can move together with the sliding block 462. During operation, the sliding block 462 and the support frame 48 move together in the Z-direction under the driving of the first motor 42, and in turn drives the swinging bars 441 to swing about the pivots 442 at the same time, thereby the swinging ends 449 and the flower petals swinging towards or away from each other. Such sex toy is preferably suitable for the female, wherein flower petals swinging towards or away from each other may pinch the breasts, and the second stimulation module 50 may generate vibration to stimulate the nipples. It should be understood that such sex toy may also be used for breast massage, which is beneficial for the treatment of breast diseases.

Figure 16A:
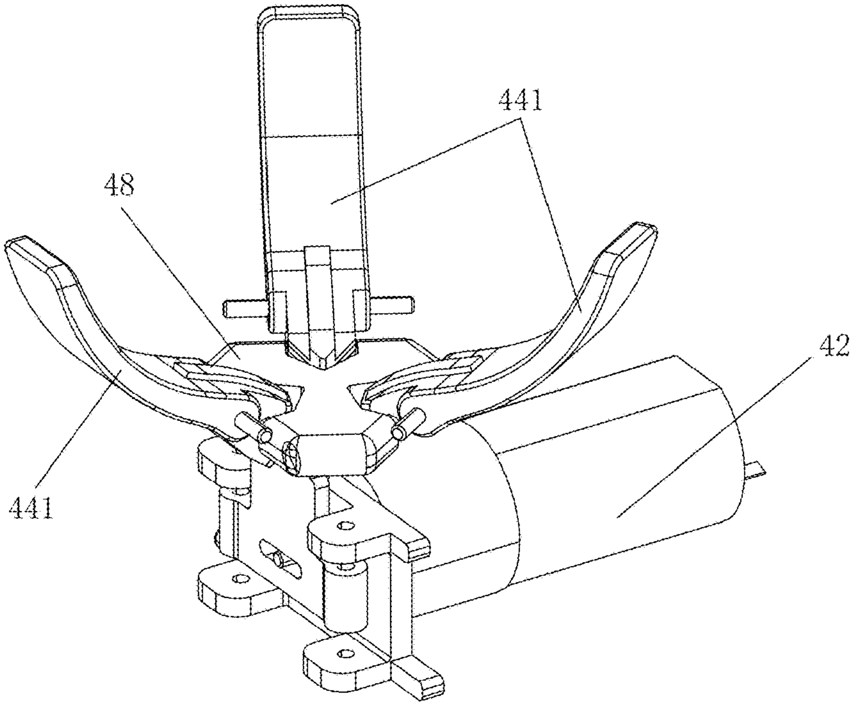
FIG. 16*a* is a schematic view of the first stimulation module according to another embodiment.
Figure 17:
FIG. 17 is an isometric, assembled view of a sex toy according to a third embodiment of the present application.
Figure 18:
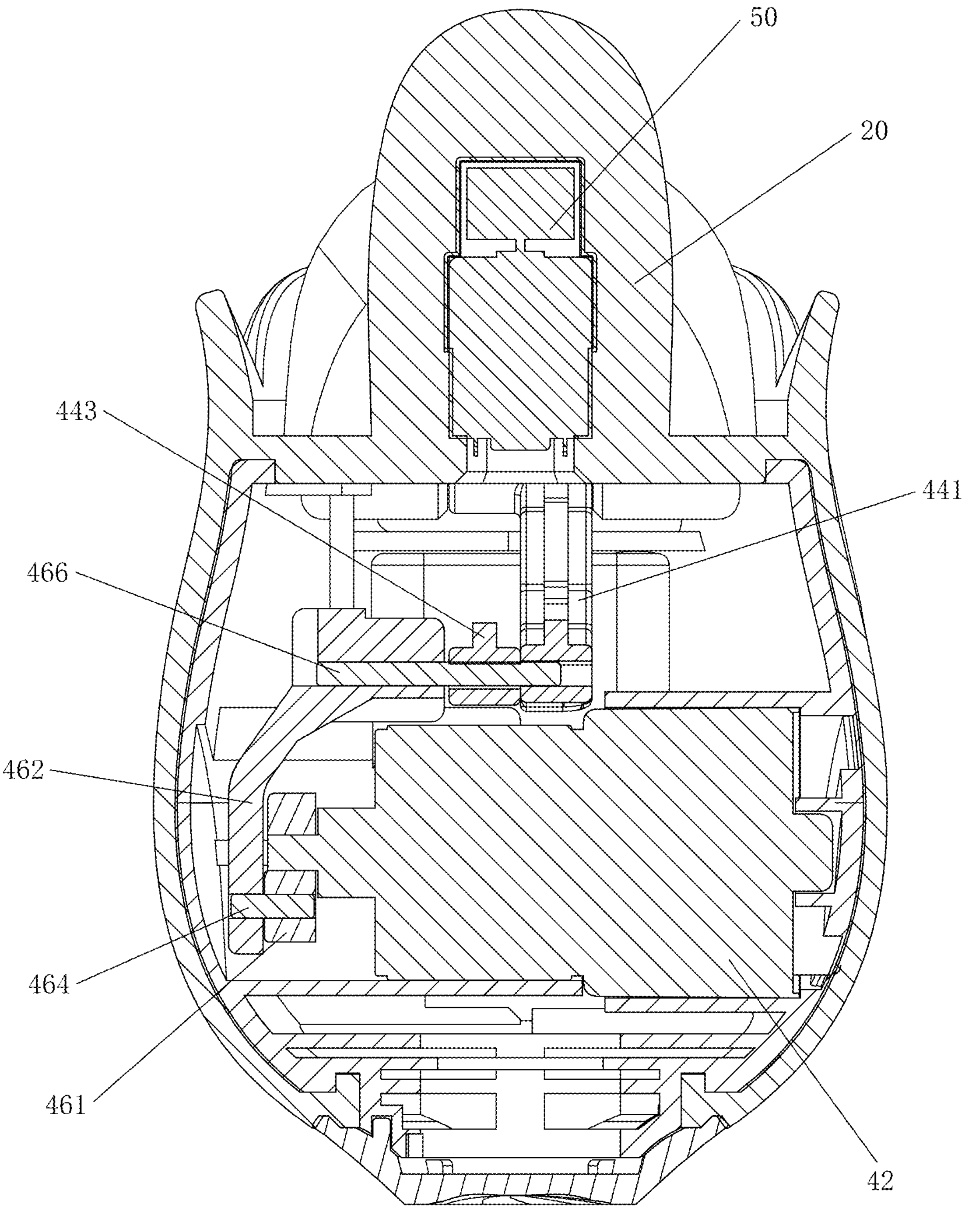
FIG. 18 is a cross sectional view of the sex toy of FIG. 17.
Figure 19:
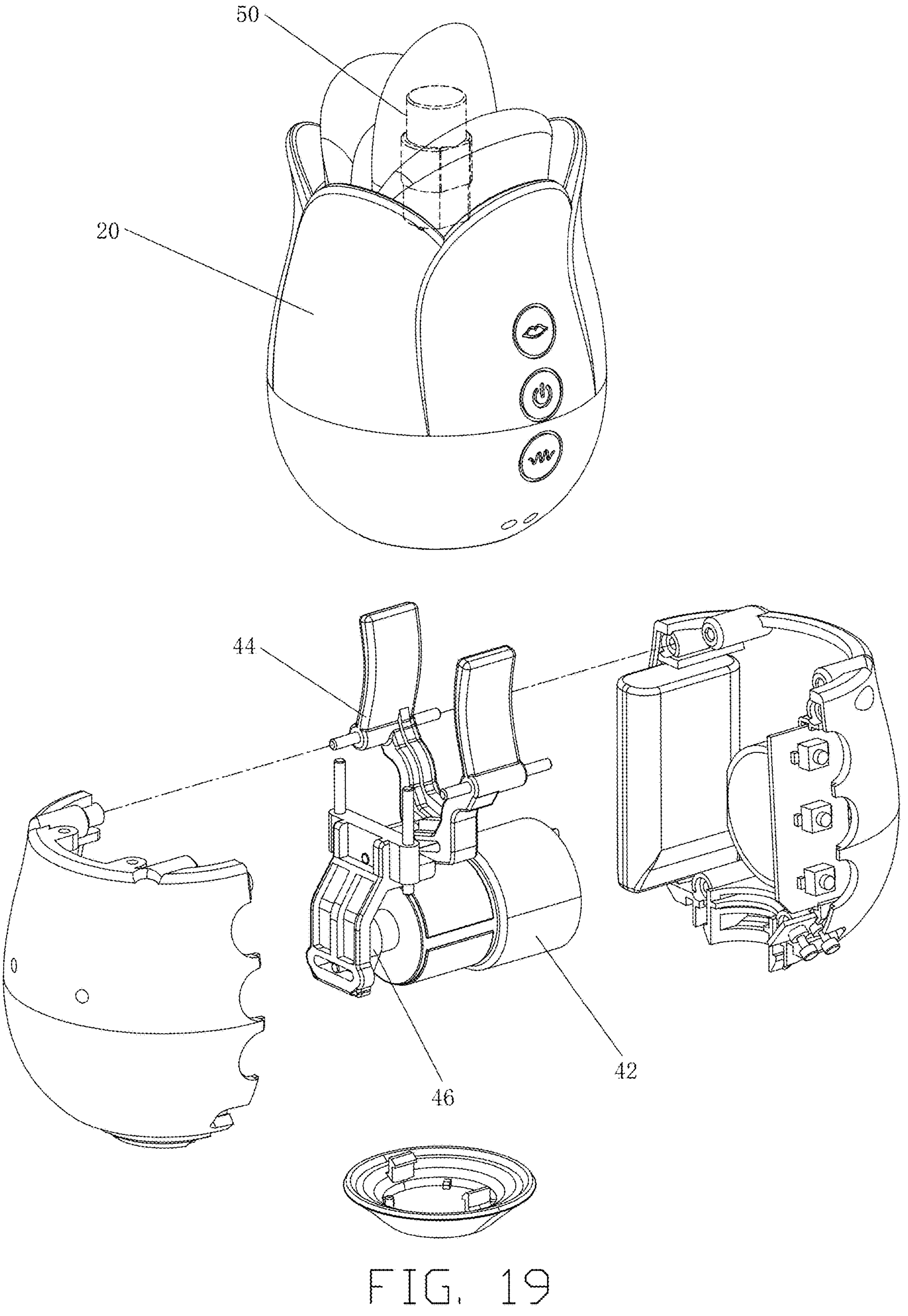
FIG. 19 is an exploded view of the sex toy of FIG. 17.
Figure 20:
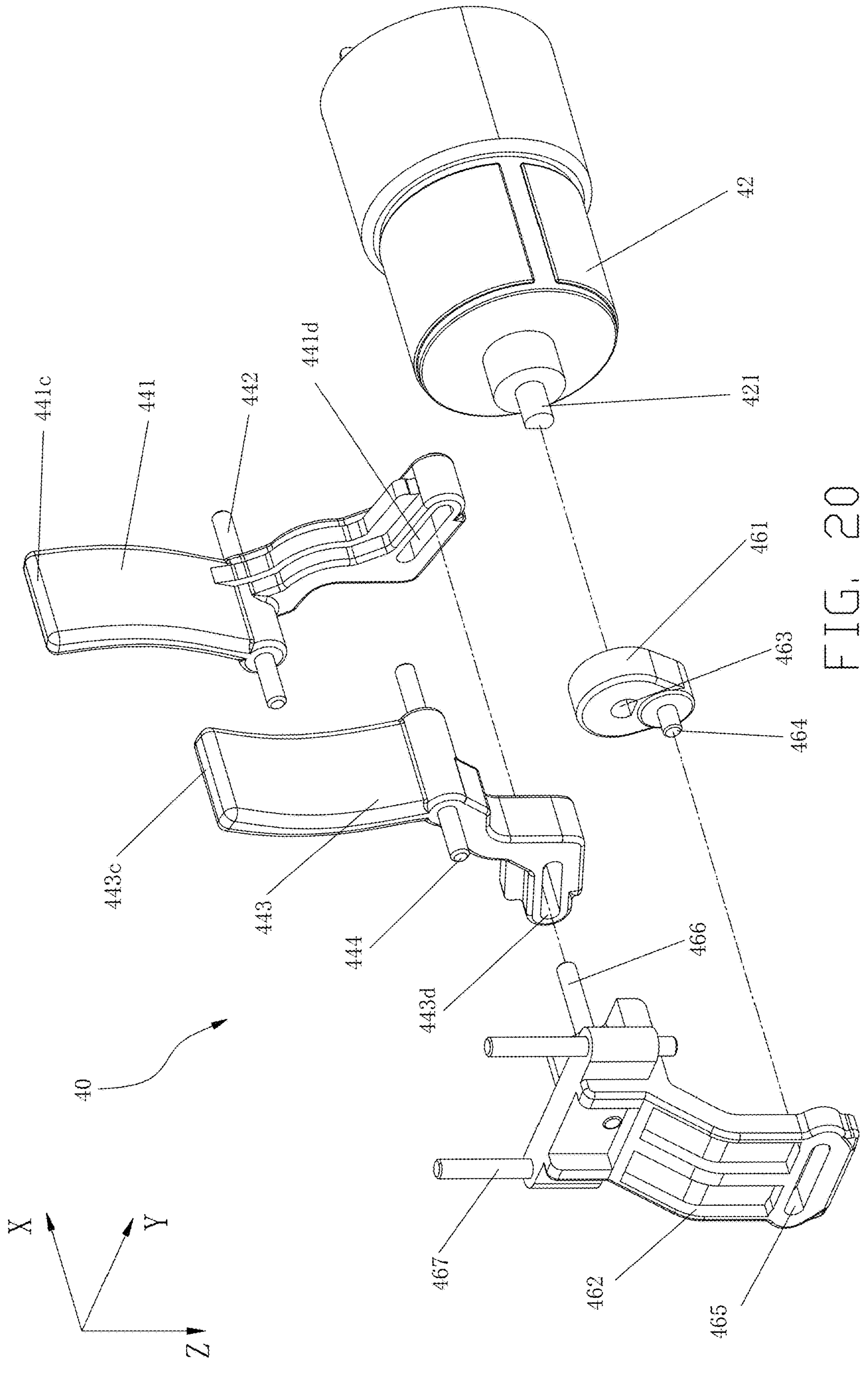
FIG. 20 is a further exploded view of a first stimulation module of the sex toy of FIG. 17.

It should be understood that, the number of the swinging bars and the flower petals of the shell are not limited to be four as this embodiment. In other embodiments, there may be three, five, six and etc. flower petals in the shell, and correspondingly three, five, six and etc. swinging bars may be provided in the swinging unit. Correspondingly, the support frame may be configured as a polygon, and a number of its lateral sides should be the same or larger than that of the swinging bars. FIG. 16 shows a sex toy with two swinging bars 441, and the support frame 48 is generally square-shaped with two lateral sides thereof connected to the two swinging bars 441. FIG. 16*a* shows a sex toy with three swinging bars 441, and the support frame 48 is generally hexagonal-shaped.

Referring to FIGS. 17-20, a sex toy 100 according to a third embodiment of the present application is shown. In this embodiment, the sex toy 100 includes a shell 20 being substantially configured as a mere budding rose, and first and second stimulation modules 40, 50 mounted in the shell 20.

In this embodiment, the first stimulation module 40 includes a first motor 42, a swinging unit 44, and a transmission unit 46 connected between the first motor 42 and the swinging unit 44. The swinging unit 44 includes a first eccentric wheel 461 connected to a rotary shaft 421 of the first motor 42 at a central portion thereof and a sliding block 462 defining a sliding groove 465 for accommodating a first rod 464 of the first eccentric wheel 461, wherein the first rod 464 extends along the X-direction and is set eccentrically on the first eccentric wheel 461, and the sliding groove 465 is elongated along the Y-direction. Rotation of the first motor 42 is converted into linear reciprocating motion of the sliding block 462 in the Z-direction by the transmission unit 46.

The swinging unit 44 includes a first swinging bar 441 and a second swinging bar 443 which are arranged substantially symmetric to each other. The first swinging bar 441 is rotatably connected to the inner shell 24 by a first pivot 442, and the second swinging bar 443 is rotatably connected to the inner shell 24 by a second pivot 444. An end of the first swinging bar 441 is configured as a first swinging end 441*c*, and an end of the second swinging bar 443 is configured as a second swinging end 443*c*. The first swinging end 441*c* and the second swinging end 443*c* are opposite to each other in the Y-direction, and extend into two flower petals of the outer shell 22, respectively.

Another end of the first swinging bar 441 defines a first slot 441*d* therein, and another end of the second swinging bar 443 defines a second slot 443*d* therein. A second rod 466 extends outwardly from the sliding block 462 along the X-direction, and is movably engaged into the first slot 441*d* and the second slot 443*d*. During operation, the first motor 42 drives the another ends of the first swinging bar 441 and second swinging bar 443 to do reciprocating movement synchronously in the Z-direction, making the first swinging bar 441 swing about the first pivot 442 and the second swinging bar 443 swing about the second pivot 444, thereby the first swinging end 441*c* and second swinging end 443*c* swinging towards or away from each other to achieve stimulation effects.

In this embodiment, the second stimulation module 50, which may be a vibration motor, is mounted inside a flower core of the shell 20, which is configured as a tongue and positioned between the two flower petals with the first and second swinging ends 441*c*, 443*c*. Thereby, the first stimulation module 40 and the second stimulation module 50 can provide stimulation to the sensitive areas of the human body in different manners, achieving better stimulation effects. Such sex toy is preferably suitable for females, wherein the swinging flower petals may be used to stimulate the external genitalia of the women and the flower core extending beyond the flower petals may be used to stimulate the clitoris.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A sex toy, comprising:

a shell comprising at least two swinging portions, a male genitalia accommodating space being defined between the at least two swinging portions; and a first stimulation module mounted in the shell and comprising at least two swinging bars being rotatably connected to the shell, wherein each of the at least two swinging bars comprises a swinging end extending into one of the at least two swinging portions of the shell, and the swinging ends of the at least two swinging bars are swingable towards each other or away from each other, and the at least two swinging portions are swingable together with the swinging ends of the at least two swinging bars to stimulate a male genitalia accommodated inside the male genitalia accommodating space during use.

2. The sex toy according to claim 1, wherein the at least two swinging portions are arranged opposite to each other, each of the at least two swinging portions is arc-shaped and elongated, making the male genitalia accommodating space between the at least two swinging portions being substantially circular-shaped in a plane where the at least two swinging portions swing.

3. The sex toy according to claim 2, wherein the at least two swinging portions comprises at least three swinging portions being arranged at two opposite sides, a number of the swinging portions at one of the two opposite sides is different from that at another one of the two opposite sides.

4. The sex toy according to claim 2, wherein the at least two swinging portions comprises 2N swinging portions which are arranged symmetrically at two opposite sides, wherein N is an integer greater than or equal to 1.

5. The sex toy according to claim 2, wherein the shell further comprises a main portion, the first stimulation module is mounted inside the main portion, the at least two swinging portions extend curvedly from two opposite sides of the main portion towards each other, distal ends of the at least two swinging portions are adjacent to and spaced from each other, and a vibration member is mounted in the distal ends of the at least two swinging portions.

6. The sex toy according to claim 5, wherein a third stimulation module is arranged in the main portion of the shell, and comprises a motor, an eccentric wheel connected to the motor and a swinging rod with one end being rotatably connected to the eccentric wheel and another end embedded in the main portion of the shell.

7. The sex toy according to claim 1, wherein the first stimulation module further comprises a first motor and a transmission unit connected between the first motor and the at least two swinging bars, the transmission unit is configured to convert rotation of the first motor into linear reciprocating motion in a first direction; each of the at least two swinging bars further comprises a connecting end being connected to and moving together with the transmission unit, and each of the at least two swinging bars is rotatable about a rotary axis which extends along a second direction perpendicular to the first direction.

8. The sex toy according to claim 7, wherein the transmission unit comprises an eccentric wheel and a sliding block, the eccentric wheel comprises a first rod extending along the second direction and revolving round a rotary shaft of the first motor under the driving of the first motor, the sliding block defines a sliding groove being elongated along a third direction which is perpendicular to the first direction and second direction, and the first rod is engaged in the sliding groove for driving the sliding block to move in the first direction.

9. The sex toy according to claim 8, wherein the connecting ends of the at least two swinging bars each defines a strip-shaped slot therein, and a second rod extends from the sliding block and movably engages into the slots of the connecting ends of the at least two swinging bars.

10. A sex toy, comprising:

a shell comprising at least two swinging portions;

a first stimulation module mounted in the shell and comprising at least two swinging bars being rotatably connected to the shell, wherein each of the at least two swinging bars comprises a swinging end extending into one of the at least two swinging portions of the shell, and the swinging ends of the at least two swinging bars are swingable towards each other or away from each other; and a second stimulation module mounted in the shell and comprising a vibration member, wherein the vibration member is arranged in or between the at least two swinging portions;

wherein the first stimulation module further comprises a first motor and a transmission unit connected between the first motor and the at least two swinging bars, the transmission unit is configured to convert rotation of the first motor into linear reciprocating motion in a first direction; each of the at least two swinging bars further comprises a connecting end being connected to and moving together with the transmission unit, and each of the at least two swinging bars is rotatable about a rotary axis which extends along a second direction perpendicular to the first direction; and wherein the transmission unit comprises an eccentric wheel and a sliding block, the eccentric wheel comprises a first rod extending along the second direction and revolving round a rotary shaft of the first motor under the driving of the first motor, the sliding block defines a sliding groove being elongated along a third direction which is perpendicular to the first direction and second direction, and the first rod is engaged in the sliding groove for driving the sliding block to move in the first direction.

11. The sex toy according to claim 10, wherein the shell further comprises a vibration portion accommodating the vibration member therein, the at least two swinging portions are arranged around the vibration portion, and the vibration portion of the shell extends beyond a space encircled by the at least two swinging portions.

12. The sex toy according to claim 10, wherein the shell further comprises a vibration portion accommodating the vibration member therein, the at least two swinging portions are arranged around the vibration portion, and the vibration portion of the shell is located within the space encircled by the at least two swinging portions.

13. The sex toy according to claim 10, wherein the sliding block is connected to a polygon-shaped support frame, and the at least two swinging bars comprise at least three swinging bars, wherein the connecting ends of the at least three swinging bars are rotatably connected to lateral sides of the support frame, respectively.

14. The sex toy according to claim 10, wherein the connecting ends of the at least two swinging bars each defines a strip-shaped slot therein, and a second rod extends from the sliding block and movably engages into the slots of the connecting ends of the at least two swinging bars.

15. A sex toy for male, comprising:

a first fixing portion and a second fixing portion being arranged opposite to each other and cooperatively defining a first chamber therebetween;

at least one first swinging portion and at least one second swinging portion being arranged opposite to each other and cooperatively defining a second chamber therebetween;

wherein the first fixing portion and the at least one first swinging portion are arranged in a line, the second fixing portion and the at least one second swinging portion are arranged in a line;

wherein the first chamber and the second chamber communicate with each other and cooperatively form an accommodating space that is column-shaped; and wherein the at least one first swinging portion and at least one second swinging portion are swingable towards each other or away from each other to stimulate a male genitalia accommodated inside the accommodating space during use.

16. The sex toy for male according to claim 15, wherein the first fixing portion and second fixing portion each are curved sheet.

17. The sex toy for male according to claim 15, wherein the at least one first swinging portion and at least one second swinging portion each are curved column.

18. The sex toy for male according to claim 17, wherein distal ends of the at least one first swinging portion and at least one second swinging portion are adjacent to and spaced from each other.

19. The sex toy for male according to claim 18, further comprising a main portion with a stimulation module provided therein, and the at least one first swinging portion and at least one second swinging portion are driven to swing towards each other or away from each other by the stimulation module;

the first fixing portion and second fixing portion extend from two opposite sides of a front half part of the main portion, respectively; and the at least one first swinging portion and at least one second swinging portion extend from two opposite sides of a rear half part of the main portion, respectively.

20. The sex toy for male according to claim 19, wherein the at least one first swinging portion comprises at least two first swinging portions arranged in a line; and/or, the at least one second swinging portion comprises at least two second swinging portions arranged in a line.

* * * * *